United States Patent [19]

Cobb et al.

[11] Patent Number: 4,840,279
[45] Date of Patent: Jun. 20, 1989

[54] CABINET STORAGE RACKS

[75] Inventors: Dean L. Cobb, Hoffman Estates; Edward M. Bleser, Elgin, both of Ill.

[73] Assignee: Grayline Housewares, Elgin, Ill.

[21] Appl. No.: 222,702

[22] Filed: Jul. 19, 1988

[51] Int. Cl.⁴ ............................................... A47F 5/08
[52] U.S. Cl. ...................................... 211/88; 211/187
[58] Field of Search ................. 211/88, 103, 106, 187, 211/181, 207; 248/250; 108/144, 111

[56] References Cited

U.S. PATENT DOCUMENTS

| | | | |
|---|---|---|---|
| 1,555,904 | 10/1925 | Brunson | 211/106 X |
| 1,741,928 | 12/1929 | Gafney | 211/106 |
| 2,074,785 | 3/1937 | Gentz | 211/106 X |
| 2,608,305 | 8/1952 | Sager | 211/106 X |
| 3,595,404 | 7/1971 | Goldstein | 211/106 X |
| 4,387,811 | 6/1983 | Ragir et al. | 211/106 X |
| 4,669,692 | 6/1987 | Mastrodicasa | 211/187 |

*Primary Examiner*—J. Franklin Foss
*Assistant Examiner*—Sarah A. Lechok Eley
*Attorney, Agent, or Firm*—Robert E. Knechtel; Basil E. Demeur

[57] ABSTRACT

A storage rack comprised of a pair of brackets, each of which preferably and advantageously is of a two-piece construction so that they can be easily packaged for storage and shipping. Along with these brackets there is provided a number of shelves which are of a vinyl coated wire construction and can be in different lengths. The storage racks are attached to a cabinet door by first affixing the brackets in parallel, spaced-apart relationship to the inside of the cabinet door. In affixing these brackets to the cabinet door, the spacing between them should at least closely approximate the length of shelves to be supported by the brackets. It is not necessary that the spacing between the brackets be exact, since the shelves are designed to compensate for variations in the spacing between the brackets. In this respect, the shelves have a bottomwall, a front wall and a pair of side walls. The side walls are of a unique construction in that they are not secured to the bottom wall and are free to be bent to expand, or reduce, the spacing between the terminal ends thereof. The terminal ends of the side walls have affixed thereto fastening means which are formed to be adjustably and releasably secured to the brackets by extending the ends thereof into a pair of spaced-apart holes in the brackets. In this respect, the brackets have spaced-apart holes along the length thereof so that the shelves can be adjustably spaced apart on the brackets, as desired.

5 Claims, 2 Drawing Sheets

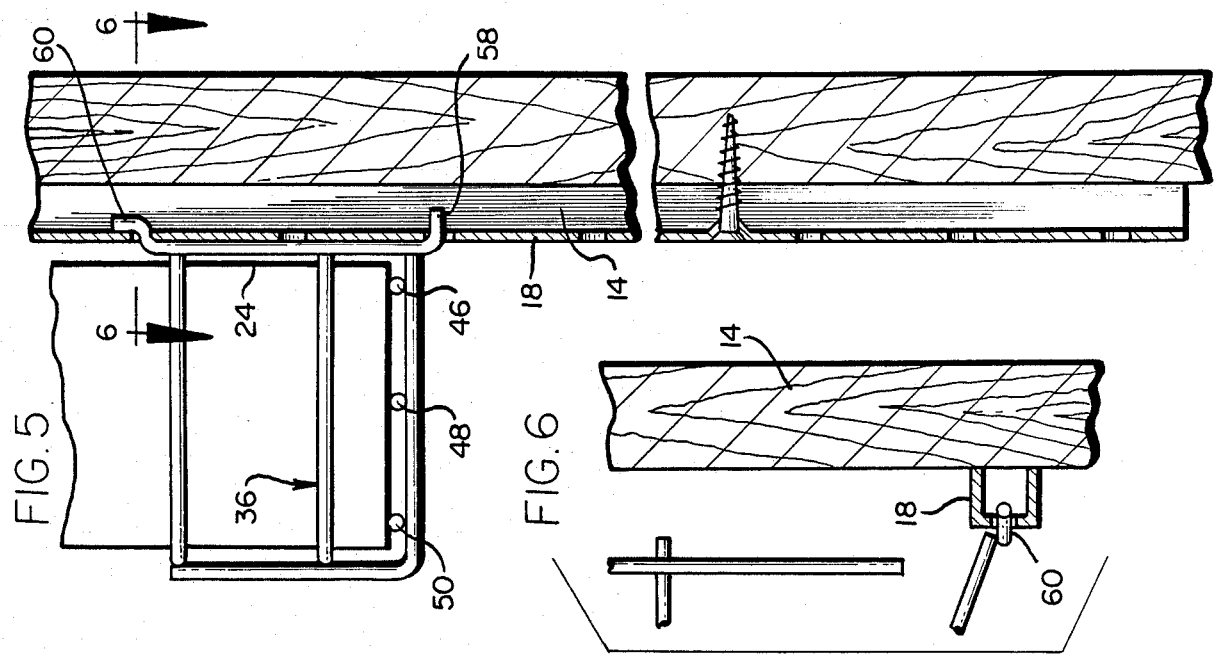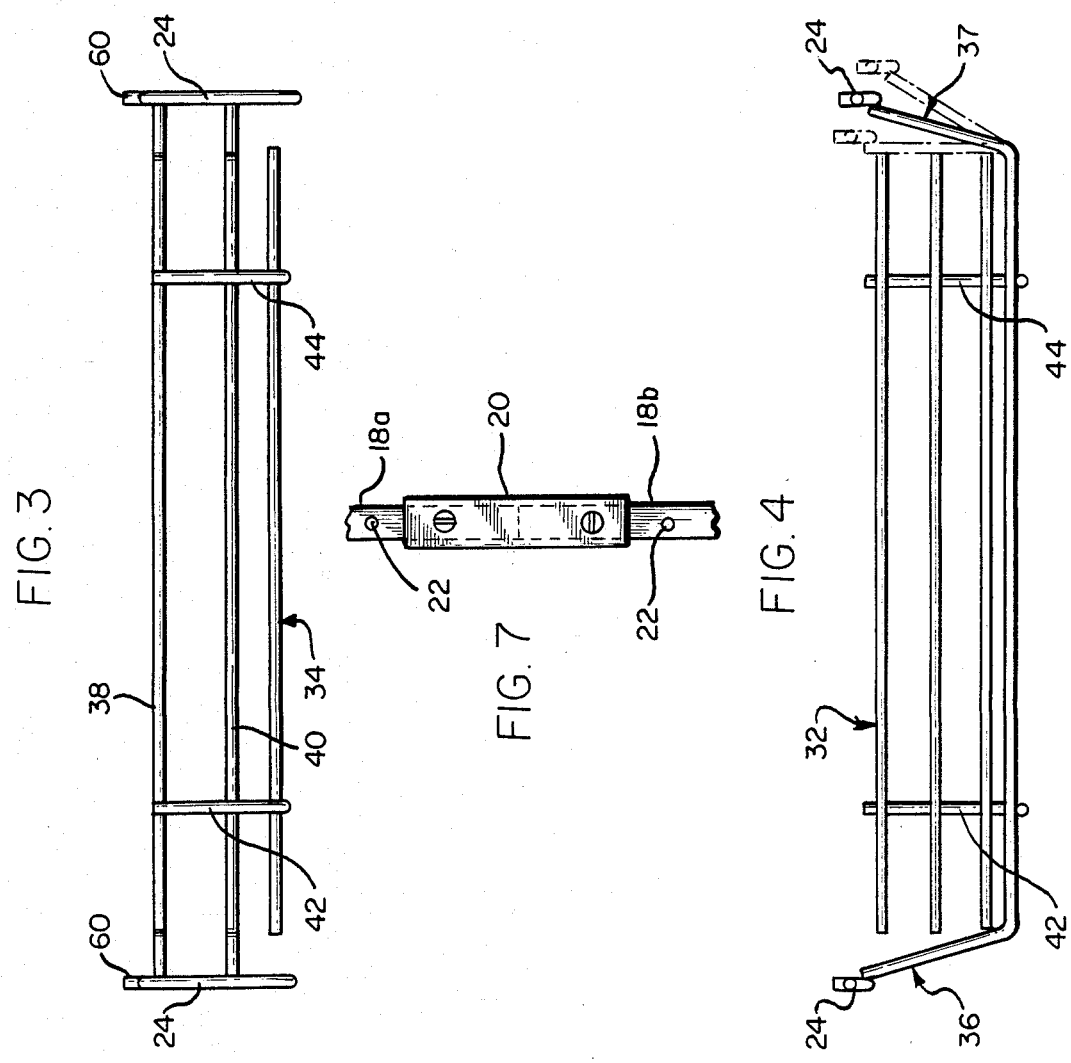

CABINET STORAGE RACKS

BACKGROUND OF THE INVENTION

This invention relates to storage racks. More particularly, it relates to improved storage racks which are of a modular construction and which are adjustable to fit various arrangements. More particularly still, the storage racks are adjustable to fit cabinets throughout the house whether the cabinet is in the kitchen, bath or pantry.

Cabinet storage racks generally are well known, however, most, if not all of the existing storage racks, are of a unitary construction and are not adjustable to fit cabinets of different sizes. These storage racks also are difficult to package, store, ship and display for sale because of the unitary construction.

In contrast to available storage racks, the storage rack of the present invention is comprised of a pair of brackets, each of which preferably and advantageously is of a two-piece construction so that they can be easily packaged for storage and shipping. Along with these brackets there is provided a number of shelves, usually three, which are of a vinyl coated wire construction. The shelves can be provided in different lengths, such as, for example, 9 inch, 11½ inch and 14 inch, so as to accommodate cabinets of various sizes.

The storage racks are attached to a cabinet door by first affixing the brackets in parallel, spaced-apart relationship to the inside of the cabinet door. In affixing these brackets to the cabinet door, the spacing between them should at least closely approximate the length of shelves to be supported by the brackets. It is not necessary that the spacing between the brackets be exact, since the shelves are designed to compensate for variations in the spacing between the brackets.

The shelves, as indicated above, are of a vinyl coated wire construction having a bottom wall, a front wall and a pair of side walls. The side walls are of a unique construction in that they are not secured to the bottom wall and are free to be bent to expand, or reduce, the spacing between the terminal ends thereof. The terminal ends of the side walls have affixed thereto fastening means which are formed to be adjustably and releasably secured to the brackets by extending the ends thereof into a pair of spaced-apart holes in the brackets. In this respect, the brackets have spaced-apart holes along the length thereof so that the shelves can be adjustably spaced apart on the brackets, as desired.

As indicated above, the side walls are not secured to the bottom wall and are free to be bent to expand, or reduce, the spacing between the terminal ends thereof. Accordingly, if, for example, a 9 inch shelf is to be affixed to the brackets and the brackets are not mounted exactly 9 inches apart, the terminal ends of the side walls can be bent outwardly, or inwardly, to compensate for the variation in the spacing between the brackets. With this arrangement, the storage racks can be more easily and quickly mounted on the cabinet doors.

It is, thererfore, an object of the present invention, to provide an improved modular storage rack which is of a modular construction and which is adjustable to fit various arrangements.

DESCRIPTION OF THE DRAWING

The above, as well as other objects and features not specifically mentioned, will become apparent from the description below when taken in conjunction with the following drawings, wherein:

FIG. 3 is a front plan view of one of the shelves of the storage rack;

FIG. 4 is a top plan view of the shelves of FIG. 3;

FIG. 5 is a side plan view, partially sectionalized, illustrating the storage rack affixed to the inside of a cabinet door;

FIG. 6 is a top plan view, partially sectionalized, illustrating the manner in which the shelves are attached to the brackets, and FIG. 7 is a partial view illustrating one of the connectors.

DESCRIPTION OF THE PREFERRED EMBODIMENT

Figure 1:
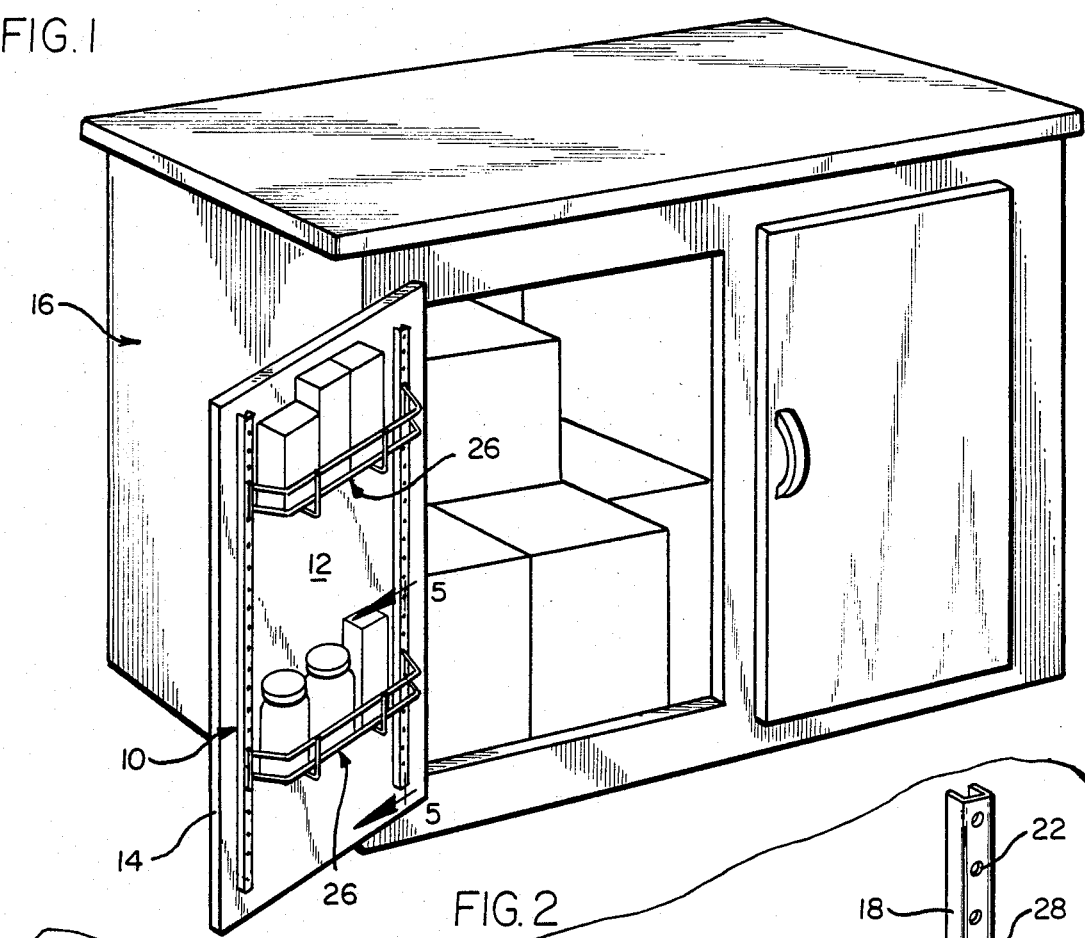
FIG. 1 is a perspective view of a cabinet having a storage rack exemplary of the invention mounted to the inside of a cabinet door thereof.

Referring now to the drawings, in FIG. 1 there is illustrated a storage rack 10 exemplary of the invention mounted to the inside surface 12 of a cabinet door 14 of a cabinet 16. As indicated above, the storage rack 10 is adjustable to fit cabinets throughout the house whether the cabinet is in the kitchen, bath or pantry.

Figure 2:
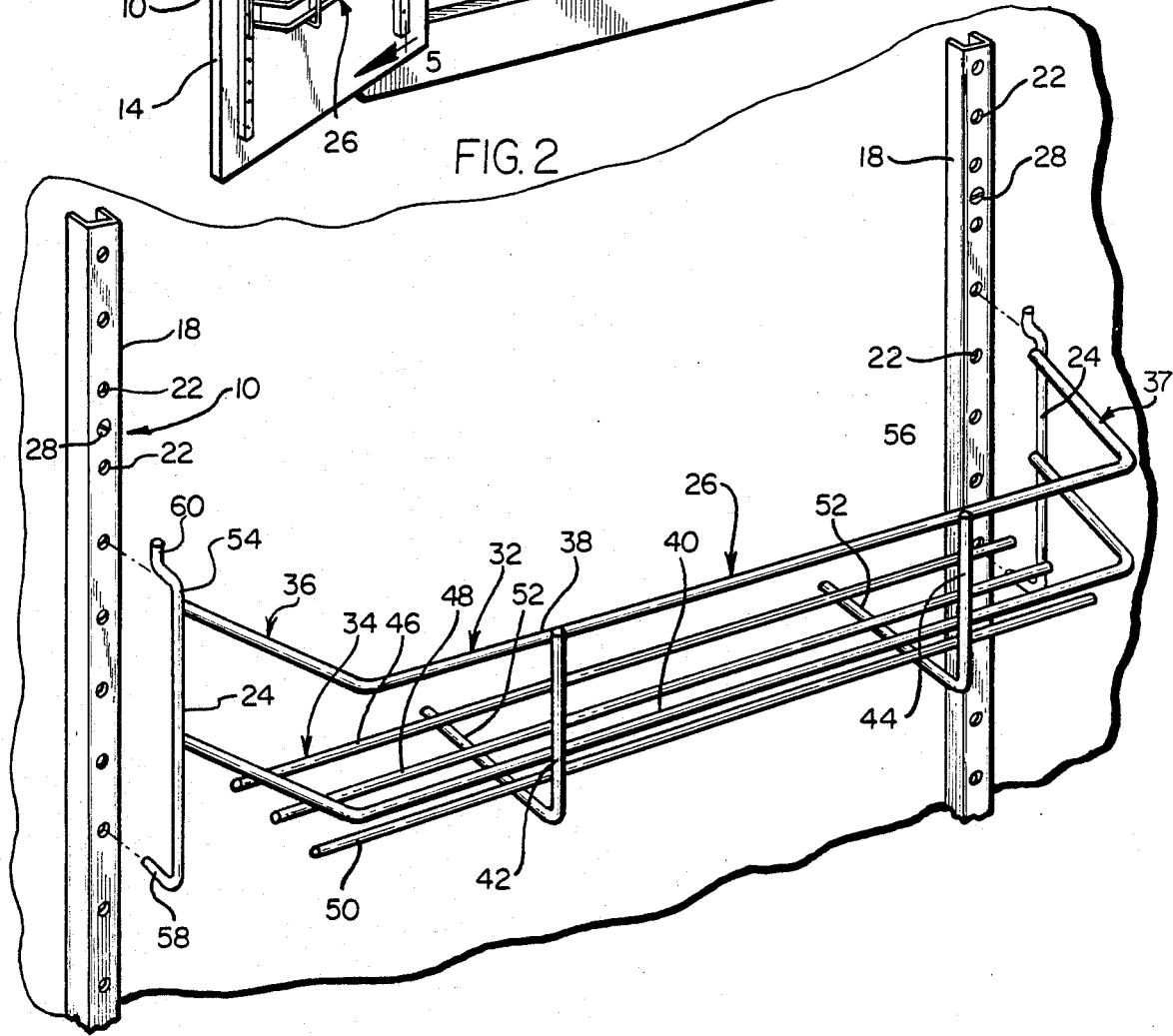
FIG. 2 is a partial perspective view generally illustrating the storage rack of the invention and the manner in which the shelves are adjustably affixed to the brackets thereof.

The storage rack 10 is comprised of a pair of brackets 18. Preferably and advantageously each of the brackets 18 is composed of two sections 18a and 18b which are adapted to be affixed together by means of a connector 20 (FIG. 7) so that the two sections can be mounted together as a unit. Obviously, the two sections 18a and 18b can be separately mounted without the use of the connector 20 as illustrated in FIG. 2, but the connector 20 permits the two sections to be more easily mounted in properly aligned relationship. Also, the brackets 18 could be a single length, however, the two sections permit the entire storage risk to be more easily packaged for storage and shipping. The brackets 18 are of a U-shaped configuration having a plurality of holes 22 formed in them in spaced-apart relationship along the length thereof for receiving the mounting arms 24 of the shelves 26 as more particularly described below. The brackets 18 are mounted in spaced-apart relationship to the inside of the cabinet door 14 by means of threaded screws 28 or the like extended through the holes 22 provided in the brackets 18. As previously indicated, the shelves 26 can be provided in various widths so that the storage racks 10 can be more easily fitted to the cabinet doors 14. For example, the shelves 26 can be provided in widths of 9 inches, 11½ inches or 14 inches. In this respect, depending on the widths of the shelves 26, the brackets 18 are mounted in spaced-apart relationship to the cabinet doors 14 a distance substantially corresponding to the width of the shelves 26 to be adjustably and removably affixed to them. However, as discussed above, if the spacing between the brackets 18 does not correspond exactly to the width of the shelves 26, the shelves 26 are designed to compensate for variations in spacing, as more particularly described below.

A number of shelves 26 can be adjustably and releasably affixed to the brackets 18 and in FIG. 1 two shelves 26 are illustrated. The shelves 26 are preferably vinyl coated wire shelves having a front wall 32, a bottom wall 34 and side walls 36 and 37. The shelves 26 can be of a number of different configurations so long as they provide the intended functions of supporting items to be stored on them and can be adjusted to compensate for variations in spacing between the brackets 18. In the illustrated embodiment, the front wall 32 is formed by two spaced-apart vinyl coated wires 38, 40 which are secured to two spaced-apart L-shaped vinyl coated wires 42, 44. The bottom wall 34 likewise is formed of three vinyl coated wires 46, 48 and 50 which are secured in spaced-apart relationship to the horizontally extending leg 52 of the L-shaped wires 42, 44. The side walls 36, 37 actually are formed by extending the length of the wires 38, 40 which form the front wall 32, the same being bent to extend in the direction of the bottom wall 34. The terminal ends of these pairs of wires 38, 40 have a mounting bracket 54, 56 affixed thereto. These mounting brackets 54, 56 each is affixed to extend perpendicular to the wires 38, 40 and each has one end 58 which is bent to extend perpendicular to extend rearwardly in the direction of the bottom wall 34. The other end 60 of the mounting brackets 54, 56 are bent to extend rearwardly in the same direction and for the same length, and then are bent to extend perpendicularly upward to form an extension of the mounting brackets 54, 56 which will releasably lock behind the brackets 18, as illustrated in FIG. 5.

In mounting the storage rack 10, the brackets 18 first are affixed to the inside surface 12 of a cabinet door 14 as described above and as illustrated in FIG. 1. Thereafter, the shelves 26 are releasably and adjustably mounted to the brackets 18 by extending the ends of the mounting brackets 54, 56 into and through correspondingly aligned holes 22 in the brackets 18 so that these ends 60 are engaged behind the brackets 18, as illustrated in FIG. 5. The mounting brackets 54, 56 are proportioned such that when the ends 60 thereof are engaged behind the brackets 18 as shown in FIG. 5, the ends 58 thereof will engage in lower holes 22 in the bracket 18, as illustrated. In the event the brackets 18 are not mounted so as to be spaced-apart the exact width between the side walls 36, 37, these side walls 36, 37, since they are not secured to the bottom wall 34 and are flexible, can be bent outwardly or inwardly to compensate for the spacing between the brackets 18 to permit the mounting brackets 54, 56 to be lockingly engaged with the brackets 18 to mount the shelves 26 as illustrated in FIG. 4. Accordingly, the shelves 26 can be more easily and quickly mounted to the brackets 18.

What is claimed is:

1. A storage rack for mounting to cabinet doors and the like comprising, in combination:
    a pair of brackets of an extended length having a plurality of spaced apart holes therein along the length thereof for receiving therein shelf mounting means for securing shelves to said brackets, said brackets being mounted in spaced-apart parallel relationship and
    at least one shelf having a front wall, a bottom wall and a pair of adjustably positionable side walls which are free from said bottom wall, each of said pair of side walls being free-standing and the terminal ends thereof having fastening means affixed to them for removably securing said shelf to said brackets, said adjustably positionable permitting said side walls to be positioned to compensate for variations in the spacing between said pair of brackets, whereby said shelves can be more easily and quickly removably mounted to said brackets.

2. The storage rack of claim 1 comprising a plurality of shelves removably and adjustably secured to said pair of brackets.

3. The storage rack of claim 2, wherein said shelves are of a vinyl coated wire construction.

4. The storage rack of claim 1, wherein said side walls are formed by extending said front wall and bending the same to form said free-standing side walls.

5. The storage rack of claim 1, wherein each of said pair of brackets is of a two-piece construction and connector means are provided for securing said two pieces together to form said bracket, whereby said bracket can be more easily packaged for shipping and storage.

* * * * *